US009770068B1

(12) United States Patent
Aleshka et al.

(10) Patent No.: US 9,770,068 B1
(45) Date of Patent: Sep. 26, 2017

(54) MID-POINT INDICATOR LACE

(71) Applicants: Adam A. Aleshka, Winnipeg (CA); Blake G. Forsyth, Winnipeg (CA)

(72) Inventors: Adam A. Aleshka, Winnipeg (CA); Blake G. Forsyth, Winnipeg (CA)

(*) Notice: Subject to any disclaimer, the term of this patent is extended or adjusted under 35 U.S.C. 154(b) by 383 days.

(21) Appl. No.: 14/154,562

(22) Filed: Jan. 14, 2014

Related U.S. Application Data

(60) Provisional application No. 61/898,699, filed on Nov. 1, 2013.

(51) Int. Cl.
A43C 9/00 (2006.01)
A43C 1/00 (2006.01)
G09B 19/00 (2006.01)

(52) U.S. Cl.
CPC ............ A43C 9/00 (2013.01); A43C 1/00 (2013.01); G09B 19/0076 (2013.01); Y10T 24/37 (2015.01); Y10T 24/3726 (2015.01)

(58) Field of Classification Search
CPC ....... Y10T 24/3726; Y10T 24/37; A43C 9/00; A43C 1/00; A43C 9/02; G09B 19/0076
USPC ............................................ 434/260; D2/978
See application file for complete search history.

(56) References Cited

U.S. PATENT DOCUMENTS

| 931,949 | A | * | 8/1909 | Morrow | A43C 7/00 24/713 |
|---|---|---|---|---|---|
| 3,168,769 | A | | 2/1965 | Smith | |
| 4,017,984 | A | | 4/1977 | Bonfigli | |
| 4,721,468 | A | | 1/1988 | Alexander et al. | |
| 4,764,119 | A | | 8/1988 | Miraglia | |
| 4,842,522 | A | | 6/1989 | Alexander et al. | |
| 5,110,296 | A | | 5/1992 | Cohen | |
| 5,240,418 | A | * | 8/1993 | Silverman | G09B 19/0076 434/260 |
| 5,430,621 | A | * | 7/1995 | Raskas | A43B 1/0036 362/103 |
| 5,639,244 | A | | 6/1997 | Stricklin | |
| 5,722,757 | A | * | 3/1998 | Chien | A43B 1/0072 36/137 |
| 7,287,342 | B2 | | 10/2007 | Keen | |

* cited by examiner

Primary Examiner — Robert J Sandy
(74) Attorney, Agent, or Firm — Robert C. Montgomery; Montgomery Patent & Design, LP

(57) ABSTRACT

A lace including a stitched or printed center point indicator enables a user to visually locate the center point of the lace. The lace further having a pair of aglets affixed on the distal ends thereof.

9 Claims, 6 Drawing Sheets

MID-POINT INDICATOR LACE

RELATED APPLICATIONS

The present invention was first described in and claims the benefit of U.S. Provisional Application No. 61/898,699, filed Nov. 1, 2013, the entire disclosures of which are incorporated herein by reference.

FIELD OF THE INVENTION

The present invention relates generally to laces for footwear including a center point indicator.

BACKGROUND OF THE INVENTION

When lacing footwear or other articles with lace, where it is imperative that the ends of the lace are equidistant, it is important to locate the center point. This is especially true when lacing long tongued and high top footwear, where the lace is threaded through a large number of eyelets. In these cases in particular, if the center pint of the lace is unknown or moves, or is otherwise lost during the lacing of the footwear the lace must be rethreaded with time and energy lost to the effort. Further, a mis-lacing can cause snagging or unwanted unraveling of the tied lace, which hampers the ability to retain the footwear on the foot of the user. Therefore, there exists a need to provide a lace with some manner of indicator of its center point that is easily visible to the user before the footwear is laced.

SUMMARY OF THE INVENTION

The disadvantages of the prior art are overcome by the present invention in providing a lace including a stitched or printed center point indicator that enables a user to quickly and easily locate the center point. The lace further has a pair of aglets on the distal ends thereof. This enables the user to evenly thread the lace through the eyelets and then subsequently tie the lace together while ensuring the end points of the lace are equidistant from the center location of the footwear. This prevents snagging or unwanted unraveling of the tied lace and helps to retain the footwear on the foot of the user. In this manner, the present invention overcomes the disadvantages and shortcomings of the prior art.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
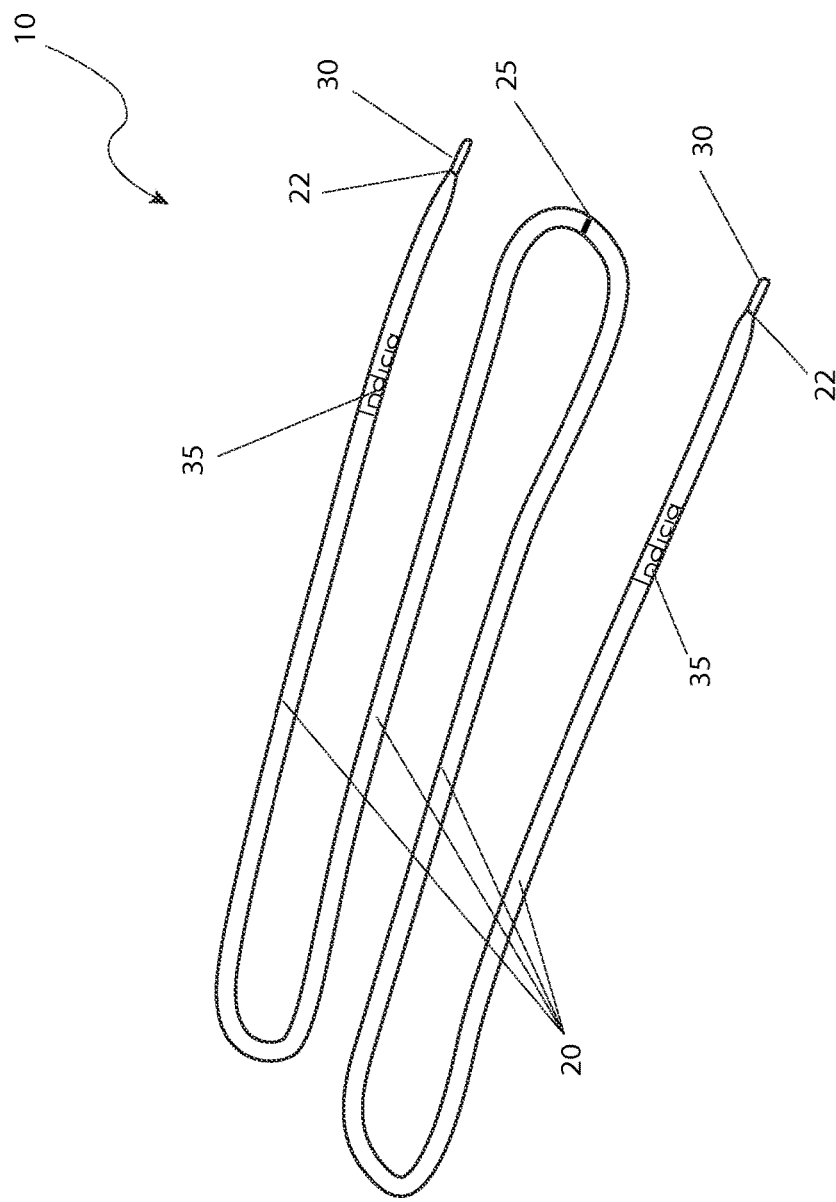
FIG. 1 is a perspective view of a mid-point indicator lace 10, according to a preferred embodiment of the present invention.

DESCRIPTIVE KEY 10 lacing assembly
20 lace
22 terminal end
25 indicator
30 aglet
35 indicia
40 eyelet
45 first pass section
55 tying section
100 hockey skate
102 first forwardmost eyelet
103 first row of eyelets
104 second forwardmost eyelet
105 second row of eyelets
106 tennis shoe

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the specifically described embodiment. A person skilled in the art will appreciate that many other embodiments of the invention are possible without deviating from the basic concept of the invention. Any such work around will also fall under scope of this invention. While only one particular configuration is shown and described that is for purposes of clarity and disclosure and not by way of limitation of scope.

The present invention describes a lacing assembly (herein described as the "device") 10, which provides a visual mid-point indicator 25 at a center point thereof. The device 10 can be provided in multiple embodiments such as, but not limited to a: shoe lace, shoestring, rope, cord, twine, or the like. The device 10 reduces time required and improves centering accuracy while installing the lace 20 into a shoe, tying a rope around an object, and other applications.

Referring now to FIG. 1, a perspective view of the device 10 depicting a shoe lacing assembly, according to the preferred embodiment of the present invention, is disclosed. The shoe lacing assembly of the device 10 includes a length of a textile lace 20 having two (2) distal or terminal ends 22 with one of a pair of plastic or metal aglets 30 affixed at each of the terminal ends 22. The aglets 30 are affixed to the lace 20 by using a crimping procedure, an adhesive, or a heat bonding process that is intended to prevent a fraying of the terminal ends 22 of the lace 20.

It is envisioned that the lace 20 may be introduced in various natural and synthetic textile materials such as cotton, polyester, leather and the like. The lace 20 has different cross-sectional shapes such as flat, round, and ovular, and sold in pairs having various matching lengths. Each device 10 includes an easily identified indicator 25 which is accurately positioned equal-distantly between each terminal end 22. The indicator 25 is formed on the lace 20 in a manner that causes it to be visually distinguishable upon the length of the lace 20. In one (1) embodiment, the indicator 25 is in a form of a short line segment and is to be applied to the lace 20 using a sewing or printing process. It is understood that the indicator 25 may be introduced in various additional embodiments such as, but not limited to: various shapes, sizes, colors, relief characteristics, and the like, all allowing a user to quickly identify a mid-point of the lace 20, and as such should not be interpreted as a limiting factor of the device 10.

The indicator 25 is to be applied to at least one (1) side of the lace 20 and include various colors which contrast that of the lace 20 to enable quick location and observation by a user. Additionally, the lace 20 is envisioned to include various indicia 35 being sewn or printed along outer surfaces which may appear at specific locations such as adjacent to the terminal ends 22, or may appear more generally along the length of the lace 20. The indicia 35 may provide script or logos based upon a user's preference and may include images such as, but not limited to: sports names/logos, personal names, symbols, pictures, and the like, in a variety of colors and patterns to further customize and personalize the device 10. It is further envisioned that the indicia 35 may work in conjunction with, or independently of, the indicator 25 to aid in identifying the mid-point of the lace 20.

Figure 2:
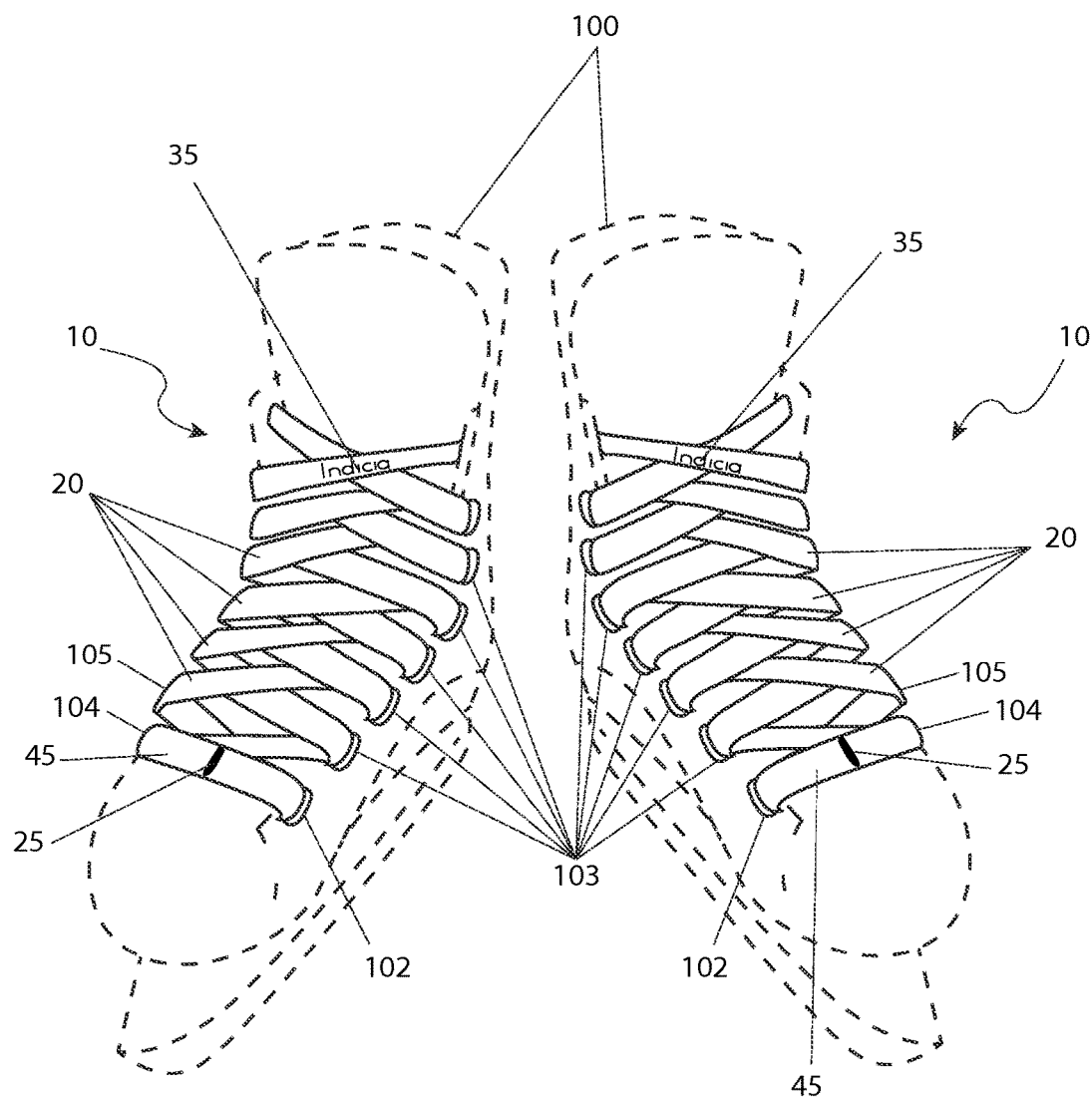
FIG. 2 is an environmental view of the mid-point indicator lace 10 depicting installation upon a hockey skate 100, according to a preferred embodiment of the present invention.
Figure 3:
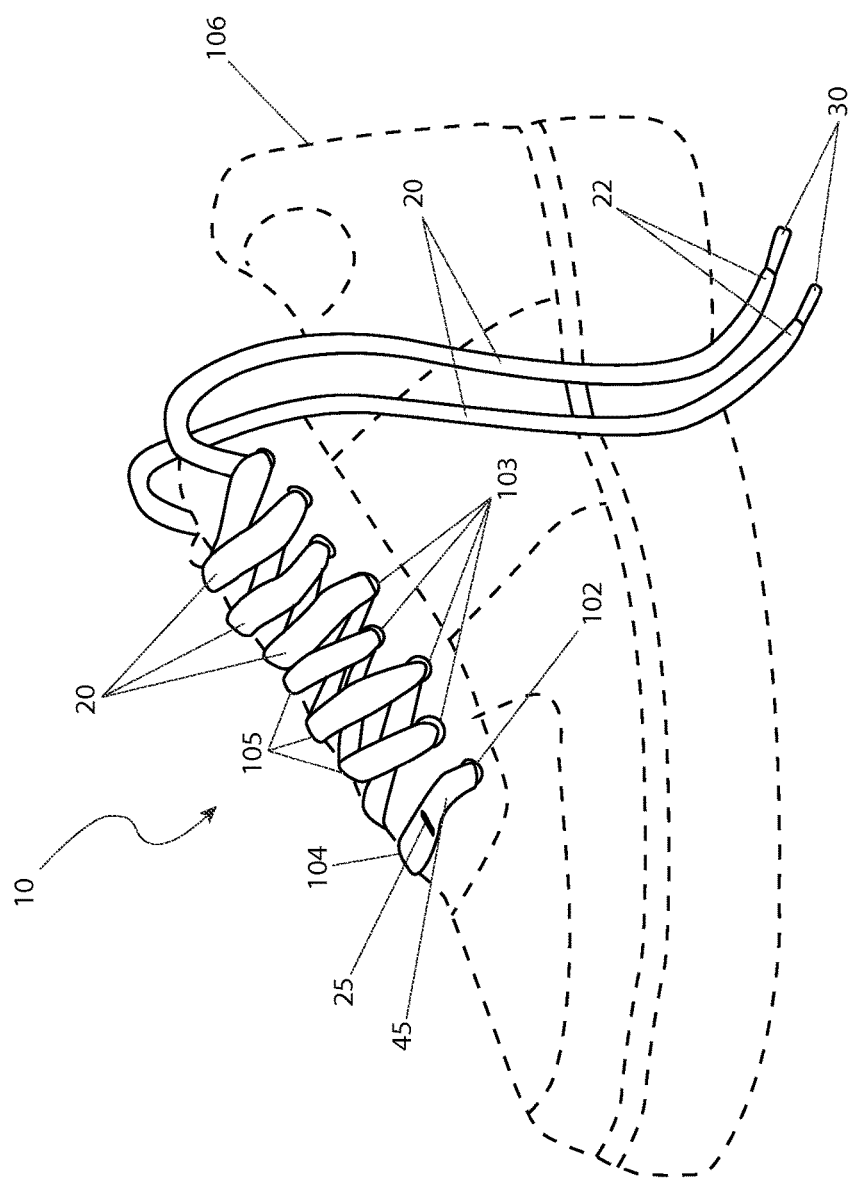
FIG. 3 is another environmental view of the mid-point indicator lace 10 depicting installation upon a tennis shoe 105, according to a preferred embodiment of the present invention.

Referring now to FIGS. 2 and 3, environmental views of the device 10 depicting installation upon ice skates 100 and tennis shoes 105, respectively, according to the preferred embodiment of the present invention, are disclosed. The device 10 is envisioned to comprise various embodiments such as longer lengths of lace 20 for applications such as ice skates 100 or the like, and shorter lengths for applications such as tennis shoes 105 and the like, and so on. Each device 10 includes a pair of aglets 30 which provide easy insertion of the terminal ends 22 through a pair of distal eyelet portions 102 and through remaining pairs of proximal eyelet portions 103 of existing shoes 100, 105 in a conventional manner.

Figure 4:
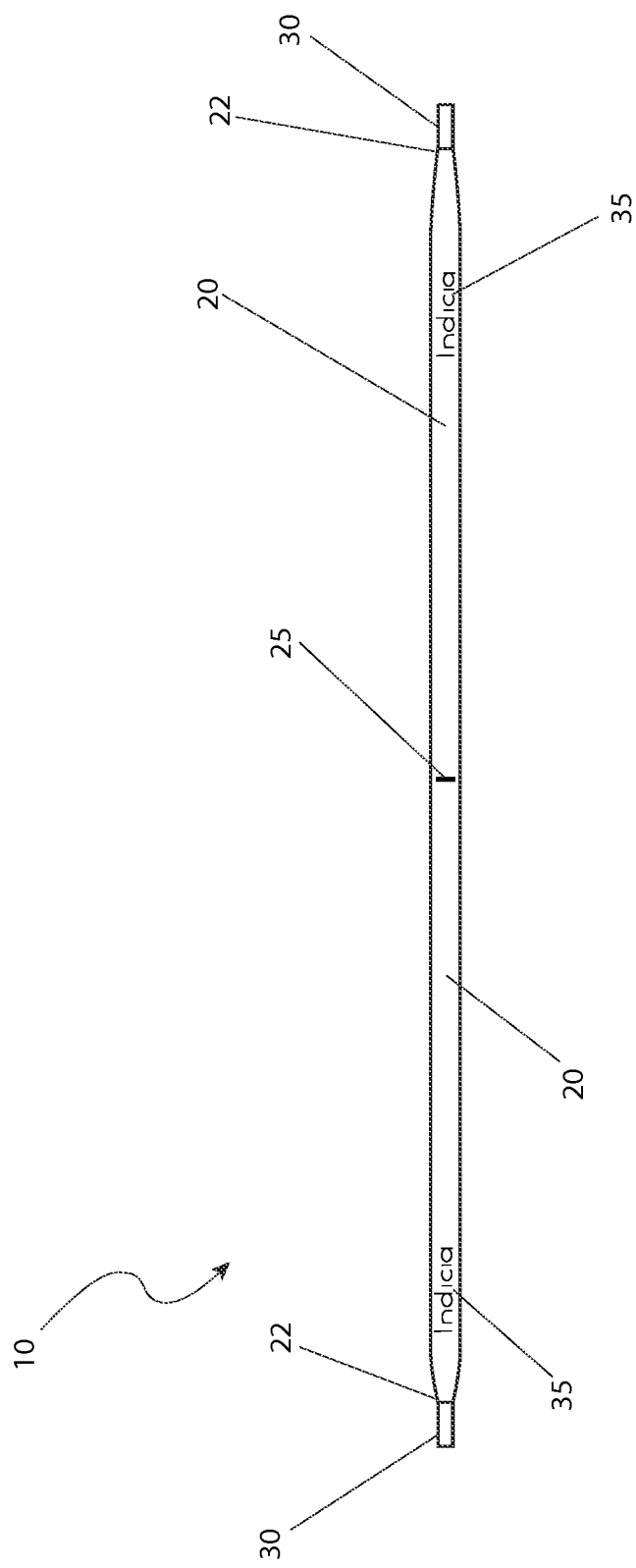
FIG. 4 is a top view of the mid-point indicator lace 10, according to a preferred embodiment of the present invention.
Figure 5:
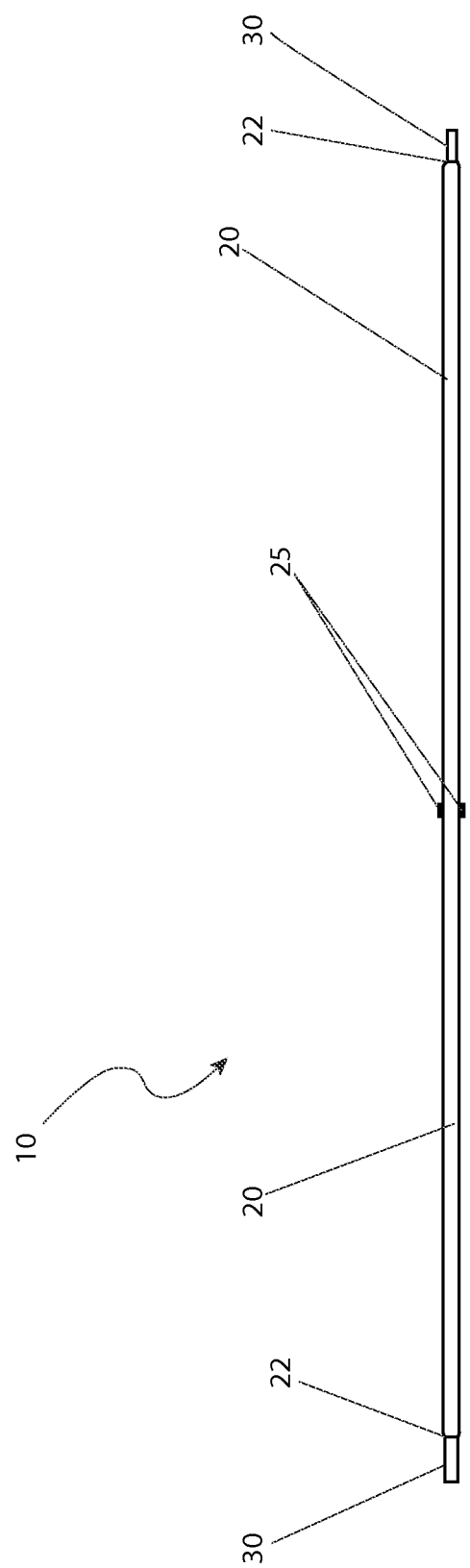
FIG. 5 is a side view of the mid-point indicator lace 10, according to a preferred embodiment of the present invention; and, FIG. 6 is an end view of the mid-point indicator lace 10, according to a preferred embodiment of the present invention.
Figure 6:
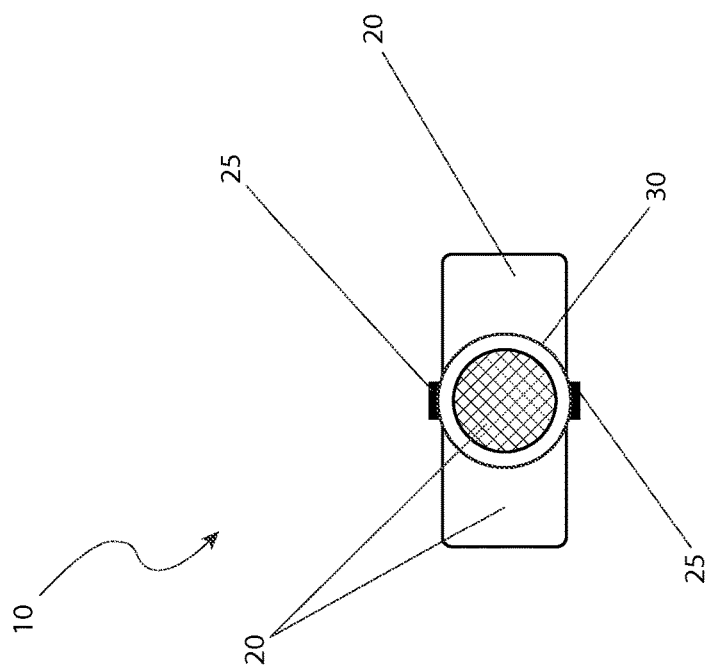

Additional embodiments of the device 10 such as lengths of rope, twine, or the like, which are used in certain applications which require location of a mid-point during use, and as such should not be interpreted as limiting the scope of the device 10. Referring now to FIGS. 4 through 6, various views of the device 10, according to the preferred embodiment of the present invention, are disclosed. It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed in an existing shoe such as an ice skate 100 or a tennis shoe 106 as indicated in FIGS. 2 and 3. Referring now to FIG. 3, the method of installing and utilizing the device 10 may be achieved by performing the following steps: procuring a model and embodiment of the device 10 having a desired textile material, length, color, and indicia 35; installing a device 10 in an existing shoe such as a tennis shoe 105 by passing the first end 22 of the lace 20 through the first forwardmost eyelet 102 of the first row of eyelets 103; then passing the second end 22 of the lace 20 through the second forwardmost eyelet 104 of the second row of eyelets 105 to form a first pass portion 45; then drawing the first and the second lace ends 22 upward and moving the lace 20 through the forwardmost eyelets 102 and 104 until the indicator 25 is positioned in the first pass portion 45 midway between the first and second forwardmost eyelets 102 and 104; continue threading the lace 20 by inserting the first end 22 of lace 20 into a next eyelet in the second row 105 of the show 106 and drawing the first end 22 through; then inserting the second end 22 of the lace 20 into a next eyelet in the first row 103 of the shoe 106 and drawing the second end 322 through; the rest of the eyelets are laced, or threaded by repeating the last two (2) steps sequentially until the first and second ends 22 of the lace 20 have exited the last eyelets in each row. The shoe can be secured by drawing the first and second ends tightly from the shoe and tying the ends 22 of the lace 20 in a conventional manner. In this manner, the user receives the benefit of a reduction of time and improved centering accuracy while installing lace 20 into a shoe 100, 105. Alternate embodiments of the device 10 may provide lengths of rope, cord, twine, or the like, being equipped with the mid-point indicator 25 so as to aid in certain applications which require location of a mid-point during use.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A lacing assembly, comprising:
 a length of lace having two distal ends, at least two opposing surfaces, a longitudinal axis, at least two laterally opposed longitudinal edges delimiting said opposing surfaces, and a center point disposed equidistant from said distal ends;
 a pair of aglets disposed upon each respective opposed one of said distal ends; and,
 a center-indicator mark disposed on said opposing surfaces of said lace at said center point of said lace, said center-indicator mark comprising a line segment extending between said longitudinal edges perpendicular to said longitudinal axis that is visually distinguishable from said opposing surfaces of said lace to visually identify said center point of said lace.

2. The lacing assembly of claim 1, wherein said center-indicator mark is raised relative to said opposing surfaces of said lace and is configured to physically identify said center point of said lace.

3. The lacing assembly of claim 1, wherein:
 said line segment comprises:
  a length dimension, disposed perpendicular to said longitudinal axis of said lace; and
  a width dimension, disposed parallel to said longitudinal axis of said lace, and
 said length dimension of said line segment is greater than said width dimension of said line segment.

4. The lacing assembly of claim 1, wherein:
 said opposing surfaces of said lace comprise a first color, said line segment comprises a second color, and said first color and said second color are different.

5. The lacing assembly of claim 1, wherein said center-indicator mark is printed on said opposing surfaces of said lace.

6. The lacing assembly of claim 1, wherein said center-indicator mark is affixed to said opposing surfaces of said lace.

7. The lacing assembly of claim 1, wherein said center-indicator mark is sewn in said opposing surfaces of said lace.

8. The lacing assembly of claim 1, wherein said lace has a rectangular cross-sectional shape.

9. The lacing assembly of claim 1, wherein said lace has an ovular cross-sectional shape.

* * * * *